United States Patent
Sanchez et al.

(10) Patent No.: US 8,229,388 B2
(45) Date of Patent: Jul. 24, 2012

(54) GEOLOCATION METHODS AND APPARATUS

(75) Inventors: Jose Antonio Sanchez, Bedfordshire (GB); Peter Fleming, Newbury (GB)

(73) Assignee: Qinetiq Limited (GB)

( * ) Notice: Subject to any disclaimer, the term of this patent is extended or adjusted under 35 U.S.C. 154(b) by 973 days.

(21) Appl. No.: 12/282,793

(22) PCT Filed: Mar. 28, 2007

(86) PCT No.: PCT/GB2007/001122
§ 371 (c)(1),
(2), (4) Date: Sep. 12, 2008

(87) PCT Pub. No.: WO2007/113489
PCT Pub. Date: Oct. 11, 2007

(65) Prior Publication Data
US 2009/0102713 A1 Apr. 23, 2009

(30) Foreign Application Priority Data
Mar. 31, 2006 (GB) .................................. 0606466.1

(51) Int. Cl.
*H04B 1/16* (2006.01)
(52) U.S. Cl. .................. 455/343.1; 455/3.01; 455/11.1; 455/12.1; 342/357.74; 342/357.75; 342/357.57; 342/357.31
(58) Field of Classification Search ............... 455/343.1, 455/3.01, 11.1, 12.1; 342/357.74, 357.75, 342/357.31, 357.57
See application file for complete search history.

(56) References Cited

U.S. PATENT DOCUMENTS

| 5,841,396 A | 11/1998 | Krasner |
| 6,133,871 A | 10/2000 | Krasner |
| 6,823,284 B2 * | 11/2004 | Gfeller et al. .................. 702/176 |
| 7,065,320 B2 * | 6/2006 | Ishigaki et al. ............... 455/12.1 |
| 2003/0107514 A1 | 6/2003 | Syrjarinne et al. |
| 2004/0087267 A1 | 5/2004 | Ishigaki et al. |
| 2004/0125014 A1 | 7/2004 | Sun |
| 2005/0253752 A1 | 11/2005 | Lalik et al. |
| 2005/0275587 A1 | 12/2005 | Siegel et al. |

FOREIGN PATENT DOCUMENTS

| WO | WO 99/63360 | 12/1999 |
| WO | WO 03/025618 | 3/2003 |

* cited by examiner

*Primary Examiner* — Sanh Phu
(74) *Attorney, Agent, or Firm* — McDonnell Boehnen Hulbert & Berghoff LLP (57) ABSTRACT

Methods and associated apparatus and programs for computers for operating geolocation devices are provided. The methods include determining the duration of a time interval during which the device is configured to remain active, responsive to a comparison between an estimate of benefit of remaining on for that time interval and an estimate of cost of remaining on for that time interval. The estimates of cost and benefit may be determined in response to user-selected parameters where by the end-user may effect a trade-off between battery life and receiver sensitivity. The methods also include varying the maximum duration of each listening period whereby to conserve battery power.

13 Claims, 4 Drawing Sheets

GEOLOCATION METHODS AND APPARATUS

FIELD OF THE INVENTION

The present invention relates to apparatus, methods, signals, and programs for a computer for geolocation (for example Global Positioning Systems (GPS)) and systems incorporating the same.

BACKGROUND TO THE INVENTION

The commercialisation of geolocation systems such as GPS has led to a proliferation of portable, and in many cases hand-held, commercially available geolocation devices including GPS tracking devices. These are typically battery powered and therefore exhibit a limited operational lifetime between battery charges or replacement.

Such devices operate by repeatedly listening for the timing signals emitted by a network of satellites having known orbits. The position of such devices is identified by a process of determining the device's location relative to several (typically three or four) such satellites whereby the position of the geolocation device may be determined.

Such geolocation devices repeatedly go through a listening cycle, during which they try to acquire timing signals from multiple satellites within a field of view. Once sufficient signals have been acquired, a calculation may be made of the device's position, based on those received signals and data obtained either from the signals themselves or from another source, and the calculated position either displayed to a user or otherwise conveyed to an associated device which can use the positional information, including transmitting the information over an uplink (for example via a GPRS or GSM link) to a remote device or system. Conversely device control, configuration, and other information may be transmitted over a downlink from the remote device or system to the geolocation device.

In order to vary the useful period during which such devices may be operated on a single battery charge it is known to vary the delay between listening cycles: the longer the interval the less power is used over an extended period. Current systems are know to vary the time interval between listening periods and this can be user controlled.

Despite such methods, battery life remains an issue with such devices and it is therefore desirable to develop alternative and improved methods of conserving battery life for these and other similar devices, whilst at the same time providing useful positioning data.

SUMMARY OF THE INVENTION

Methods and associated apparatus and programs for computers for operating geolocation devices are provided. The methods include determining the duration of a time interval during which the device is configured to remain active, responsive to a comparison between an estimate of benefit of remaining on for that time interval and an estimate of cost of remaining on for that time interval. The estimates of cost and benefit may be determined in response to user-selected parameters whereby the end-user may effect a trade-off between battery life and receiver sensitivity. The methods also include varying the maximum duration of each listening period whereby to conserve battery power.

According to a first aspect of the present invention there is provided a method of operating a geolocation device comprising determining the duration of a time interval during which the device is configured to remain active responsive to a comparison between an estimate of benefit of remaining on for that time interval and an estimate of cost of remaining on for that time interval.

In some embodiments benefit and cost are estimated for a plurality of time intervals.

In some embodiments at least one of the cost and benefit are estimated responsive to a comparison between a measure of actual time on and a measure of permitted time on.

In some embodiments the measure of permitted time on is an average permitted time on.

In some embodiments at least one of the estimate of the benefit and the estimate of the cost is derived responsive to measures of at least one of expected interval between fixes, expected usage, expected battery life, and minimum operational period.

In some embodiments the values of at least one of the measures of expected interval between fixes, expected usage, expected battery life, and minimum operational period is determined responsive to one or more user-input value.

In some embodiments the measures are determined responsive to a single user-selectable value.

In some embodiments all of the measures of expected interval between fixes, expected usage, expected battery life, and minimum operational period are determined responsive to the user-input values.

The invention also provides for apparatus for the purposes of geolocation and arranged to perform the steps of methods according to the present invention.

In particular, according to a further aspect of the present invention there is provided a geolocation device controller arranged to determine the duration of a time interval during which the device is configured to remain active responsive to a comparison between an estimate of benefit of remaining on for that time interval and an estimate of cost of remaining on for that time interval.

According to a further aspect of the present invention there is provided a tracking device comprising such a geolocation device.

Some embodiments further comprise a communications module coupled to the geolocation device and arranged to transmit geolocation data and to receive control data.

According to a further aspect of the present invention there is provided a geolocation system control centre comprising such a geolocation device controller.

The invention also provides for other system for the purposes of geolocation which comprise one or more instances of apparatus embodying the present invention.

The invention also provides for computer software in a machine-readable form and arranged, in operation, to carry out every function of the apparatus and/or methods. In this context the computer program is also intended to encompass hardware description code used to describe, simulate or implement chip and/or circuit layout used to implement the present invention.

In particular, according to a further aspect of the present invention there is provided a program for a computer for operating a geolocation device, the program comprising code portions for determining the duration of a time interval during which the device is configured to remain active responsive to a comparison between an estimate of benefit of remaining on for that time interval and an estimate of cost of remaining on for that time interval.

The invention is also directed to novel signals employed in the operation of the invention.

The preferred features may be combined as appropriate, as would be apparent to a skilled person, and may be combined with any of the aspects of the invention.

BRIEF DESCRIPTION OF THE DRAWINGS

In order to show how the invention may be carried into effect, embodiments of the invention are now described below by way of example only and with reference to the accompanying figures in which.

DETAILED DESCRIPTION OF INVENTION

Figure 1:
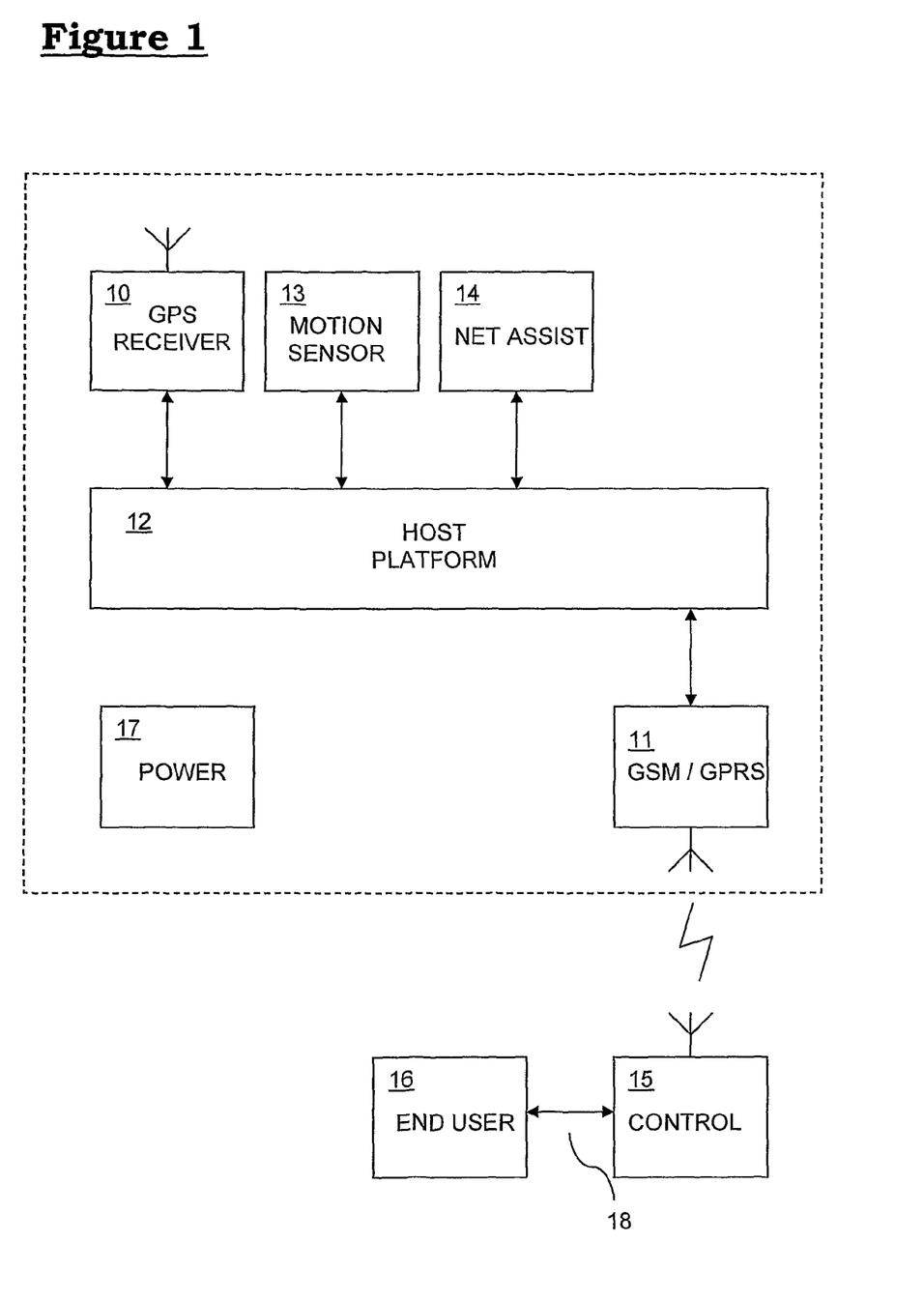
FIG. 1 shows a schematic diagram of a first embodiment of a system in according to the present invention

Referring to FIG. 1, a first embodiment comprises a GPS receiver 10, a communications subsystem 11 and a host platform 12. It may optionally also comprise a motion sensor 13 and Net Assist subsystem 14. The device may be monitored and controlled remotely from a control system 15 via which end-users 16 may interact with the device. The device also has its own power supply 17 which is arranged to power each of the subsystems (connections not shown).

In an On/Off mode, the GPS receiver 10 has no control whatsoever as to when it is turned on, and can only inform the host platform 12 when it wishes to be turned off. The GPS receiver is therefore completely reliant on the host platform carrying out the requests it is given to power down the GPs receiver. The requests are made by made by means of a simple signalling protocol (for example by means of a standard NMEA 0183 message, output at 1 Hz (the NMEA 0183 Interface Standard defines electrical signal requirements, data transmission protocol, and time, and specific sentence formats for a serial data bus)) which simply informs the host whether the GPS receiver should remain on or off.

The reason for introducing the On/Off mode of operation is as a means of power management. That is, when the GPS receiver is not required to provide fixes continuously, the On/Off mode of operation maybe employed to extend the battery life.

It must be recognised that the power required (on average) for the GPS receiver to generate a fix in a given scenario is essentially predetermined. A power management method, is used to make a trade-off between battery life and availability of positional information. At the two extremes, the method could be such that either for a given required availability the battery life is maximised or for a given required battery life the availability is maximised.

However it would not generally be acceptable for the GPS receiver to operate such that its required battery life was satisfied if, as a consequence, the receiver never generated any valid fixes. Therefore the control method must, in some cases, be prepared to sacrifice battery life in order to improve availability. Furthermore the GPS receiver cannot predict in advance how long it will take to generate a valid fix at any given time, not least because it has no useful knowledge of the details of the environment. Furthermore, that scenario will change with time: the GPS receiver might, for example, be started in an indoor car park, then moved outdoors, then moved into a brick building, etc.

Figure 2:
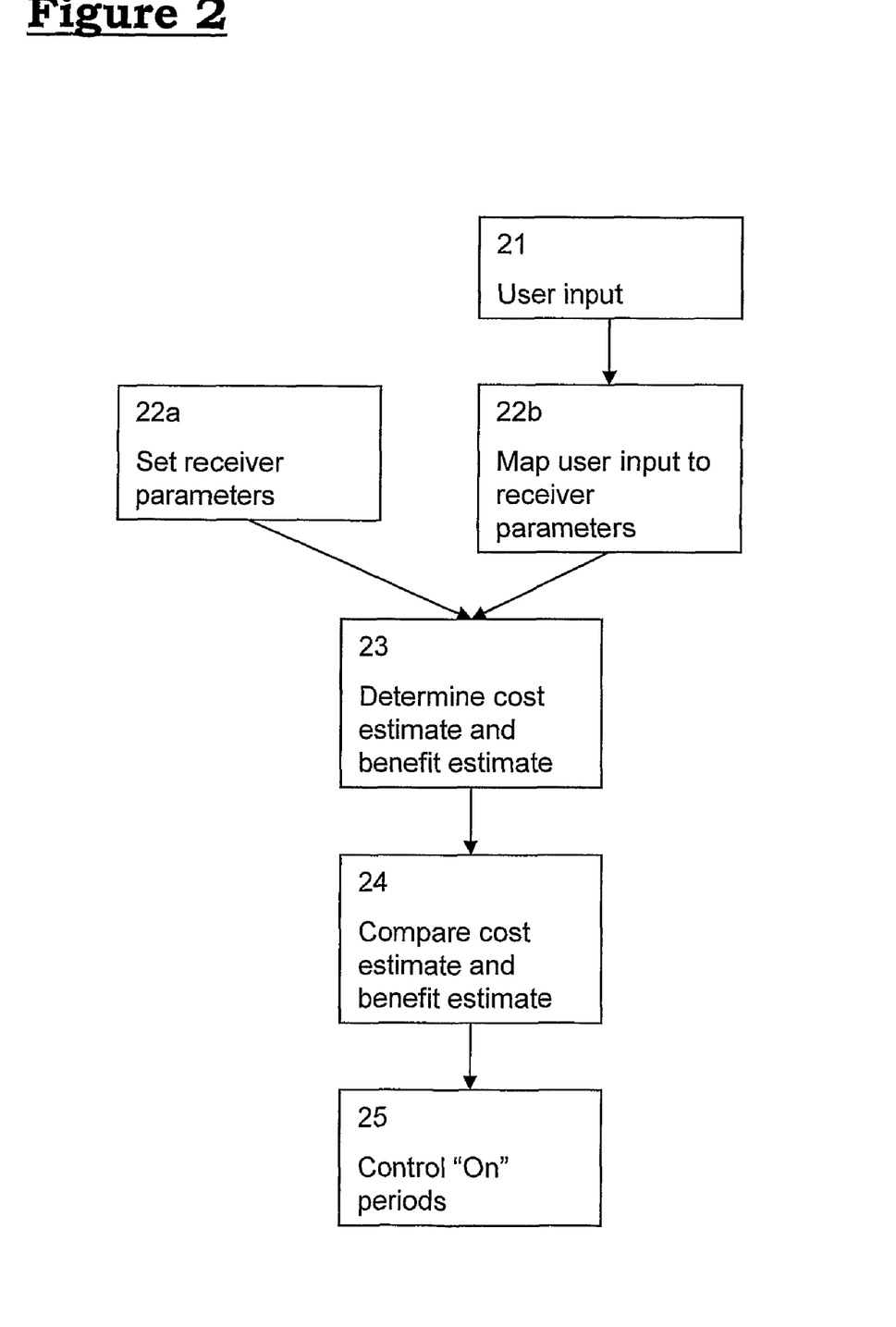
FIG. 2 shows a first method according to the present invention.

Referring now to FIG. 2, configuration of the On/Off method is based upon settings of five parameters 22a:

- The expected interval between fixes (ExpInterv), a time interval measured in integer seconds for example in the range 60 seconds (1 minute) and 3600 seconds (1 hour), but the range may be varied according to need. A value of 0 may be used to disable the On/Off mode (i.e. to revert to a continuous mode of operation). For relatively long intervals (for example over an hour) the host platform may choose when to turn the GPS receiver off, rather than rely on the On/Off mode.
- The expected usage (ExpUsage), as a percentage. This is the percentage of the time that the host expects to be turning the GPS receiver on at the specified intervals. So, for example, if the GPS receiver is expected to be used in the On/Off mode during an 8 hour working shift, but is expected to remain off outside of that time, the expected usage would be 33%, regardless of the expected interval between fixes.
- The expected life of the battery (ExpLife), in integer minutes. This is the period of time that the battery would be expected to last if the GPS receiver were operated continuously. Note that this can refer to a hypothetical, or virtual, battery. However, this is perhaps best thought of as being the expected life assuming the battery is fully charged.
- The minimum required operational period of the GPS receiver (MinReqLife), in integer minutes. Although this is not essential, it is suggested that this is thought of as being the minimum required operational period assuming the battery is fully charged.
- The Net Assist mode is a parameter which tells the GPS receiver whether to expect Net Assist position and/or ephemeris input. The relevance of this is that, for example, it would clearly be an unnecessary expenditure of power for the GPS receiver to remain on in order to try to decode ephemeris data if this same ephemeris data were likely to be provided by Net Assist.

The GPS receiver uses the first four of the above parameters to compute the total number of times it is expected to be required to generate a fix (numOn), and the average period of time it is allowed to be on in order to generate these fixes (avOnTime). These two parameters are computed as follows (noting that the software uses integer maths routines).

$$numOn = (ExpUsage * MinReqLife * 60)/(ExpInterv * 100)$$

where numOn is dimensionless, the constant 60 is used because MinReqLife is in units of minutes but ExpInterv is in seconds, and the constant 100 is used because ExpUsage is a percentage.

$$avOnTime = [(ExpLife * 60)/numOn] - 1$$

where avOnTime is in units of seconds, the constant 60 is used because ExpLife is in units of minutes, and a constant, 1, is introduced to allow a short time between the GPS receiver indicating that it wishes to be turned off and the host platform actually turning it off. The value of the constant may be varied as would be apparent to the skilled person.

The control method essentially performs a cost/benefit analysis 23, 24 to determine the duration of the time intervals during which the GPS receiver will be turned on 25. That is, at every update it looks ahead and computes estimates of the benefit of remaining switched on for various periods of time. It then estimates a cost for each of these periods of time. If the benefit is ever greater than, or equal to, the cost, the GPS receiver will choose to remain switched on. Otherwise, it will send a message to the host platform to turn the GPS receiver off.

During operation the GPS receiver keeps track of the amount of credit or debt relative to the average period of time it is allowed to be on in order to generate fixes, since it was last configured. This means that the GPS receiver is preferably re-configured each time the battery is recharged. So, for example, if avOnTime were 30 seconds, and a first attempt at generating a valid fix took 45 seconds, then the method would be in debt by 15 seconds. If a second attempt took 60 seconds, the algorithm would then be in debt by 45 seconds. However, if a third attempt took only 15 seconds, the debt would reduce to 30 seconds.

The method keeps track of its current state by saving data to non-volatile memory just before sending the message to the host that it wants to be turned off. The data saved may comprise the five configuration parameters noted above, the number of consecutive failures to fix (for use in computing the benefit of staying on) and the current credit/debit balance.

The benefit of remaining on is made up of two components. Firstly, there is a benefit in terms of being able to generate a valid fix. Clearly, the whole point of turning the GPS receiver on is for it to generate a valid fix, so there is a benefit in remaining on long enough for this to be achieved. However, in addition to the benefit for the current period, there might be a benefit for future fixes. For example, if the GPS receiver has no position data already stored in non-volatile memory then it has to perform a cold start. So the benefit of generating a valid fix in this case can be considered as being greater than if the GPS receiver were in a position to perform warm starts, because generating a valid fix during a current period will aid the ability to generate fixes in the future.

The second component of the benefit is in terms of being able to decode ephemerides, which can be used to aid future fixes.

A more detailed explanation of these two components is given below.

In computing the benefit in staying on for a given period of time so as to generate a valid fix, two elements are considered. Firstly there is the question of what the benefit is of generating a valid fix; secondly there is the question of the probability that a valid fix will be generated within the given time. A measure of the benefit of staying on for x seconds in order to generate a valid fix [denoted PosBenefit(x)] is given by the product of the benefit of generating a valid fix [denoted PosBenefit(valid)] and the probability of generating a valid fix in x seconds [denoted Probability(x)] expressed as a percentage, divided by 100. That is PosBenefit(x)=[PosBenefit(valid)*Probability(x)]/100.

benefit of generating a valid fix [i.e. PosBenefit(valid)] is defined as follows:

If there is no previous position available from non-volatile memory, the benefit is defined to be a relatively high predetermined value (for example 58 units).

If the position in non-volatile memory is considered good enough to allow a warm start, but is not good enough to be able to resolve millisecond pseudo-range ambiguities, the benefit is taken as a simple (e.g. linear) function of the expected interval between fixes, with a given range (for example a maximum value of 48 units (for a very small value of ExpInterv) and a minimum value of 0 units (for a value of ExpInterv of 30 minutes)).

Otherwise, the benefit is defined to be a relatively low-to-middle value (for example 12 units).

Note, however, that if as part of the configuration of the algorithm the GPS receiver has received an indication that Net Assist position input is available, then this is treated as being the equivalent to there being a 'good' position already in non-volatile (i.e. the benefit is defined to be 12 units), there being no benefit for future fixes in expending power generating a valid fix during the current period if the GPS receiver is going to be given a Net Assist position anyway.

The benefit may be increased if the GPS receiver was unable to generate a valid fix during its previous attempt. This increase is a function of the number of consecutive failures to fix immediately preceding the current attempt, expressed as a percentage of the total number of fixes it is expected to be required to generate (i.e. expressed as a percentage of numOn). By way of example an increase of 5 units for every 0.1% may be applied. So, for example, if numOn were 1000, 5 units would be added to the benefit for every preceding failure to fix.

The probability of generating a valid fix in a given period of time is computed in two steps.

Firstly, the minimum and maximum period of time the GPS receiver might have to stay on in order to have a 'reasonable' expectation of being able to generate a valid fix is computed. (It is important to note that these two parameters do not have an exact definition. Furthermore, their method of computation is far from exact and a number of suitable methods might be determined by empirical means.) However, the basic principle is that the method determines what additional information is needed in order to be able to compute a valid fix (e.g. waiting 2 more seconds for the position status to be elevated to 'valid', or waiting until an extra 3 satellites are acquired and pseudo-ranges generated), and then tries to predict how long it might take to acquire this additional information. To do this, it looks at each channel, and attempts to estimate the time required, firstly to acquire a satellite on that channel (responsive, for example, to the time remaining for the current search) and secondly how long it might take to decode an ephemeris for that satellite (responsive, for example, to the signal-to-noise ratio (SNR) of the signal if a satellite has already been acquired, and which navigation data sub-frames have already been decoded).

The second step in computing the probability of generating a valid fix in a given period of time involves interpolating between the above-computed minimum and maximum time periods. The basis of this is that the probability of generating a valid fix in the minimum time is assumed to be relatively low (for example 10%), and the probability of generating a valid fix in the maximum time is relatively high (for example 100%, though in reality a probability of 100% is usually far from the case). The probability (expressed as a percentage) of generating a valid fix in x seconds is then estimated as follows.

If x<minimum, Probability(x)=0

If x≧maximum, Probability(x)=100

Otherwise, Probability(x)=a function of 'minimum' and 'maximum' (for example, 10+90*(x−minimum)/(maximum−minimum)

If, as part of the configuration of the algorithm, the GPS receiver has been told to expect Net Assist ephemeris input, then the benefit of remaining on in order to decode ephemerides is defined as being zero. Otherwise, the benefit, in terms of decoding additional ephemerides, of remaining on for another x seconds is computed in three steps.

Firstly, for each channel on which a satellite has already been acquired but for which no ephemeris has been determined, the minimum and maximum period of time the receiver might have to stay on in order to have a 'reasonable' expectation of decoding the ephemeris are computed. It is important to note that these two parameters do not have a precise definition. These are computed as follows.

If the SNR is less than a given first threshold (for example 20 dBHz) it is assumed that it will not be possible to decode an ephemeris. Otherwise, the minimum time is defined as being the time until the end of the last sub-frame required to complete the set will be received.

If the SNR is above a given second threshold (for example 32 dBHz), the maximum time is defined as being the same as the minimum time. Otherwise, if the SNR is above a third threshold (for example 25 dBHz), the maximum time is defined as being 30 seconds greater than the minimum time. Otherwise (i.e. if the SNR is 21 dBHz or above), the maximum time is defined as being 60 seconds greater than the minimum time.

The second step is to compute the number of ephemerides we might 'expect' to decode within x seconds. The method for doing this is explained by means of the following pseudo-code, noting that the software uses integer maths routines:

```
integer num_expect =    50 // start off with 50 for rounding
for ( chan = 1 .. total number of channels )
    if (tracking a satellite on this channel,
        and do not yet have an ephemeris for it,
        but do expect to be able to decode an ephemeris )
        if ( x < minimum )
            probability = 0
        else if ( x ≧ maximum )
            probability = 100
        else
            probability = 10 + 90* (x − minimum) /
                (maximum − minimum)
        num_expect = num_expect + probability
num_expect = num_expect/100;
```

The third step is to define the benefit as being 1 unit for each ephemeris 'expected' if we already have 6 or more ephemerides available, or 2 units for each ephemeris 'expected' if we have fewer than 6 ephemerides available. This then gives us the benefit of staying on for x seconds in order to decode more ephemerides [(denoted EphBenefit(x)].

The cost of staying on for x seconds is computed in a number of steps. Firstly the component of the cost based just on the total time the GPS receiver will have been on during the current period is computed, as follows.

$$cost=(\{[2*(time\_on+x)-avOnTime]*6\}/avOnTime)-4$$

where time_on is the time we have currently been on during the current period. That is (time_on+x) is the total time the GPS receiver will have been on in x seconds.

The cost is inflated if the total time on will be more than a predetermined factor (for example 3.75) times the average period of time it is allowed to be on, as follows:

$$if\ (cost>35)cost=2*(cost-35)+35$$

So, if, for example, avOnTime is 30 seconds, then the cost for various times on will be as follows:

| (time_on + x) | cost |
|---|---|
| 15 | −4 |
| 30 | 2 |
| 60 | 14 |
| 90 | 26 |
| 120 | 41 |
| 150 | 65 |

The next step is to decrease the cost if the GPS receiver is within a few seconds of turning off. The reason for this is that it is undesirable to leave the receiver on for some time, only to turn it off a few seconds before getting a fix.

Then, if the GPS receiver is currently in credit, the cost is reduced by a predetermined amount (for example 5 units). Alternatively, if the GPS receiver is currently in debt by more than some amount (for example 1.25% of the expected life of the battery (i.e. 1.25% of ExpLife, or, as an example, 3 minutes if the expected life of the battery is 4 hours), the cost is increased.

Finally, it is recognised that there is always some cost by introducing a positive lower limit on the cost value (for example 1 unit).

The benefit is then compared with the cost at intervals of, for example, one second for a period of time into the future. In the embodiment described the look ahead period may be limited by a predetermined upper limit (for example 5-times the average period of time it is allowed to be on), and is such that the GPS receiver will never be on for more than 7 times the average on period (The choice of limits may be varied in other embodiments). This is explained by means of the following pseudo-code.

```
integer num_ahead = 7*avOnTime − time_on
if ( num_ahead > (5 * avOnTime) ) num_ahead = (5 * avOnTime)
for ( x = 1 .. num_ahead )
    Compute PosBenefit(x)          //
    Compute EphBenefit(x)          //
    Compute Cost(x)                //
    if ( [PosBenefit(x) + EphBenefit(x)} >= Cost(x) )
        Exit this function and remain on
if we ever reach here then the benefit has never been worth the cost, so
flag the case that we want to be turned off
```

If the GPS receiver has decided that it wants to be turned off without having been able to generate a valid fix, but it has already had a number of consecutive failures to fix, the receiver recognises that it might have to try harder even if this is at the expense of the required battery life. This is achieved by adding additional checks, to see if the GPS receiver should cancel some debt, as follows.

If there have already been 4 or some other predetermined number of consecutive failures to fix, and the receiver is still in credit (even though this might only be because it earlier cancelled some debt because of its failure to fix), and the receiver has been on for less than 3-times (or some other predetermined factor) the average period of time it is allowed to be on a decision may be taken to override the request that the GSP receiver be turned off, without changing the current credit/debit. This provides a fail-safe mechanism in the event there may be some a deficiency in the method or its implementation in respect of the current environment in which the receiver finds itself If the receiver started off this attempt to generate a fix in debt, and it has not yet cancelled any debt during the present attempt, and the number of consecutive failures to fix is greater than 1% of the total number of times it is expected to be required to generate a fix of fixes (i.e. if the number of consecutive failures to fix is greater than 1% of numOn, or, as an example, greater than 10 if numOn is 1000), then the receiver cancels some debt, as follows. If the number of consecutive failures is 20 or more, all debt is cancelled; otherwise, 50% of the debt is cancelled. The receiver then over-rides the decision to request to be turned off.

To this point the mechanism has been described without reference to the source of the commands and parameters controlling the cots-benefit analysis. In practice is maybe desirable to afford end-users of the GPS receiver to specifically control the parameters, typically via a web interface to a base system which communicates remotely with the receiver, wherever it is located. Alternatively it might be via a user interface located on the device itself.

This allows end users to trade battery life for increased availability. One simple method would be to allow end-users to manipulate the key parameters directly, but in practice the end-users may not be sufficiently sophisticated users to understand the operation of the system in such detail.

Consequently it is desirable to provide a user interface 18 (FIG. 1) which provides a limited set of options to end-users and which are in turn automatically mapped to specific values of the operational parameters of the device.

In one particular embodiment the end-user is presented with a menu offering selection of one from a predetermined set of options. These may be presented textually, numerically, or graphically, though in each case it is convenient to map the selected option to a numerical value for further computation. Taking the instance where the option value (ThrottleValue) is represented numerically, with higher numbers representing more battery charge being used so that the users have a higher probability of getting more valid fixes in GPS challenging environment, whilst lower numbers are orientated towards configurations intended to preserve battery charge resulting in the system not trying as hard to get GPS fixes in a challenging environment. Where no value is manually selected a suitable default value for may be adopted for ThrottleValue.

Referring again to FIG. 2, the selected option 21 is mapped 22b to specific settings for the method described above. In particular:

The expected interval between fixes (ExpInterv).

The expected usage (ExpUsage), as a percentage. This is typically set to 100% but may be reduced is it is known that the device will be switched on only for a smaller proportion of the day.

The expected life of the battery (ExpLife), in integer minutes. This is set to the remaining fraction of the expected battery lifetime, based on knowledge of maximum battery lifetime when fully charged, and how much power has already been drawn from the battery.

The minimum required operational period of the GPS receiver (MinReqLife), in integer minutes. MinReqLife may be set to a value responsive to the expected interval between fixes (ExpInterv) and the user-selected opton value. Fore example in one embodiment the MinReqLife may be set to:

(ExpLife*Expinterv)/f(ThrottleValue,ExpInterv)

where f(ThrottleValue, Expinterv)=(N*ThrottleValue+C) if this is less than ExpInterv, otherwise (ExpInterv−K), in which N, C, and K are empirically selected integer constants.

The Net Assist mode. This is set according to whether Net Assist location information available for the GPS device in question.

Figure 3:
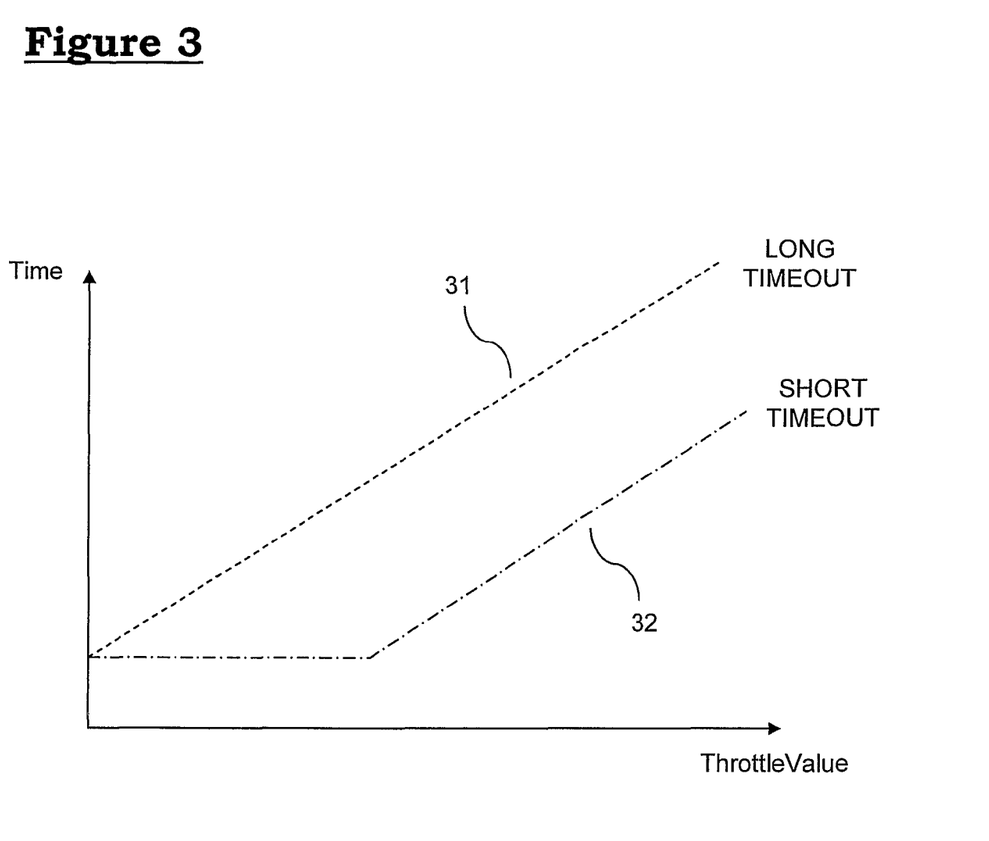
FIG. 3 shows a schematic graph of the relationship between parameters according to the present invention.

Referring now to FIG. 3 values are also determined for a long timeout and short timeout: The long timeout 31 is used by default and until the GPS receiver fails to obtain a GPS fix for the first time, from then on the short timeout is used. Long timeout="GPS throttle" number of minutes plus one The short timeout 32 is used until the GPS receiver manages to get a valid fix, at that time the long timeout is restored again. In one embodiment short timeout is set to a default minimum non-zero value ThrottleValue is below a given threshold and simple (e.g. linear) function of ThrottleValue if ThrottleValue is at or above that threshold.

Figure 4:
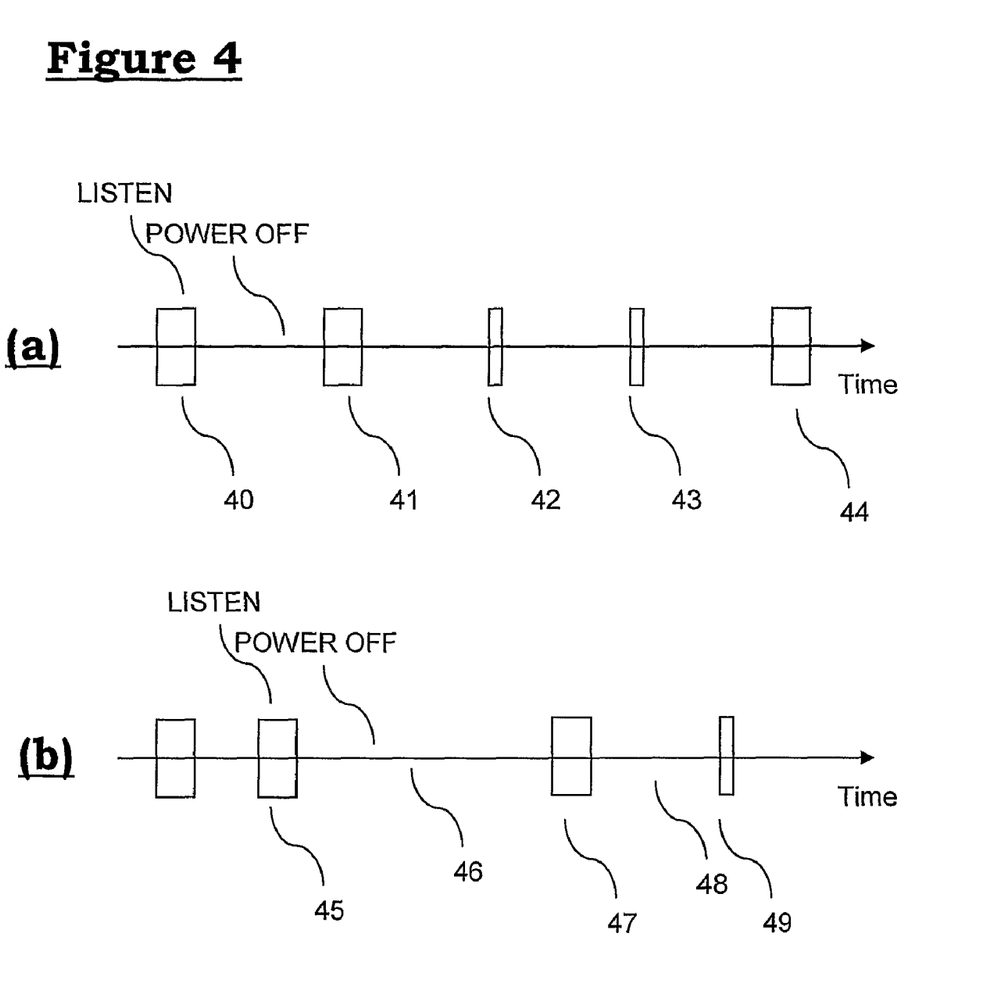
FIG. 4 shows schematic timelines illustrating variation in listening and powered-off time intervals according to the present invention.

Referring now to FIG. 4, the long and short timeouts regulate the maximum time interval 40-44 during which the GPS receiver is permitted to listen in order to obtain a GPS fix. The principal of operation is that the long timeout 40, 41, 44 imposes an upper limit on the listening period duration as determined by the On/Off control method, until the first failure to fix occurs 41; from then on the short timeout 42, 43 is applied as the upper limit. In this way, while the device is considered to be in an area where it is difficult to acquire a fix, the device is not caused to spend undue time fruitlessly listening to obtain a fix. In either case the device stops listening before reaching the timeout if a fix is obtained.

Once a fix is re-acquired 43, the long timeout value is reinstated as the upper limit of the listening period.

The cost-benefit method described above acts to regulate the listening periods 45, 47, 49 subject to the maxima determined by the long timeout and the short timeout. As illustrated in FIG. 4 (b) this may be combined with varying the time intervals 46, 48 between listening periods 45, 47, 49 to produce listening behaviour which both varies the duration of powered-off periods between listening periods and the maximum durations of the listening periods 45, 47, 49 themselves.

Any range or device value given herein may be extended or altered without losing the effect sought, as will be apparent to the skilled person for an understanding of the teachings herein.

The invention claimed is:

1. A method of operating a geolocation device comprising determining the duration of a time interval during which the device is configured to remain active as a result of comparing an estimate of benefit of remaining active for that time interval and an estimate of cost of remaining active for that time interval wherein at least one of the estimate of the benefit and the estimate of the cost is derived responsive to measures of at least one of expected interval between fixes, expected usage, expected battery life, and minimum operational period.

2. A method according to claim 1 in which benefit and cost are estimated for a plurality of time intervals.

3. A method according to claim 1 in which at least one of the cost and benefit are estimated responsive to a comparison between a measure of actual time on and a measure of permitted time on.

4. A method according to claim 3 in which the measure of permitted time on is an average permitted time on.

5. A method according to claim 1 in which the values of at least one of the measures of expected interval between fixes, expected usage, expected battery life, and minimum operational period is determined responsive to one or more user-input value.

6. A method according to claim 5 in which the measures are determined responsive to a single user-selectable value.

7. A method according to claim 5 in which all of the measures of expected interval between fixes, expected usage, expected battery life, and minimum operational period are determined responsive to the user-input values.

8. A method according to claim 1 in which the estimate of benefit is determined responsive to a measure of the ability to generate a fix and the measure of the ability to decode ephemerides within the time interval.

9. A method according to claim 1 in which at least one of the estimate of the benefit and the estimate of the cost is derived responsive to measures of each of expected interval between fixes, expected usage, expected battery life, and minimum operational period.

10. A geolocation device controller arranged to determine the duration of a time interval during which a geolocation device is to be configured to remain active responsive to a comparison between an estimate of benefit of remaining on for that time interval and an estimate of cost of remaining on for that time interval wherein at least one of the estimate of the benefit and the estimate of the cost is derived responsive to measures of at least one of expected interval between fixes, expected usage, expected battery life, and minimum operational period.

11. A tracking device comprising a geolocation device controller according to claim 10.

12. A tracking device according to claim 11 further comprising a communications module coupled to the geolocation device and arranged to transmit geolocation data and to receive control data.

13. A program for a computer for operating a geolocation device, the program comprising code portions, when executed by the computer, for performing a method comprising determining the duration of a time interval during which the device is configured to remain active responsive to a comparison between an estimate of benefit of remaining on for that time interval and an estimate of cost of remaining on for that time interval wherein at least one of the estimate of the benefit and the estimate of the cost is derived responsive to measures of at least one of expected interval between fixes, expected usage, expected battery life, and minimum operational period.

* * * * *